Oct. 30, 1956 G. M. SMITH 2,768,597
WELDING FIXTURE FOR THIN WALLED TANKS
Filed Dec. 20, 1950 4 Sheets-Sheet 2
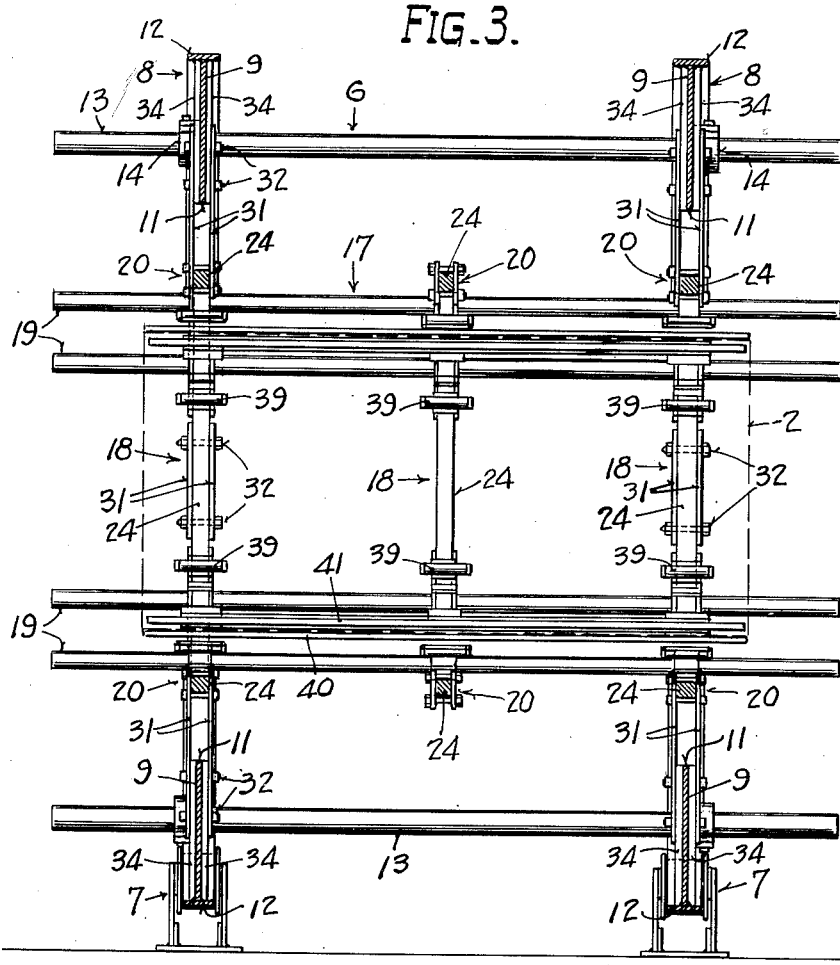
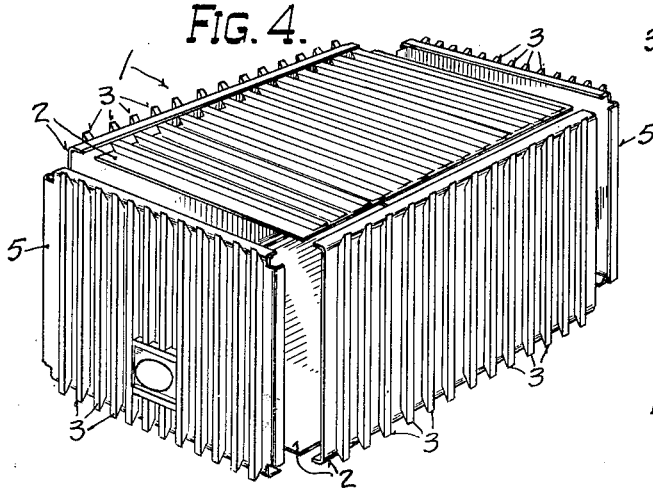
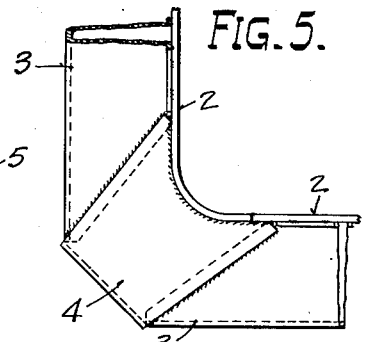
INVENTOR.
George M. Smith
BY
Andrus & Sceales
ATTORNEYS.

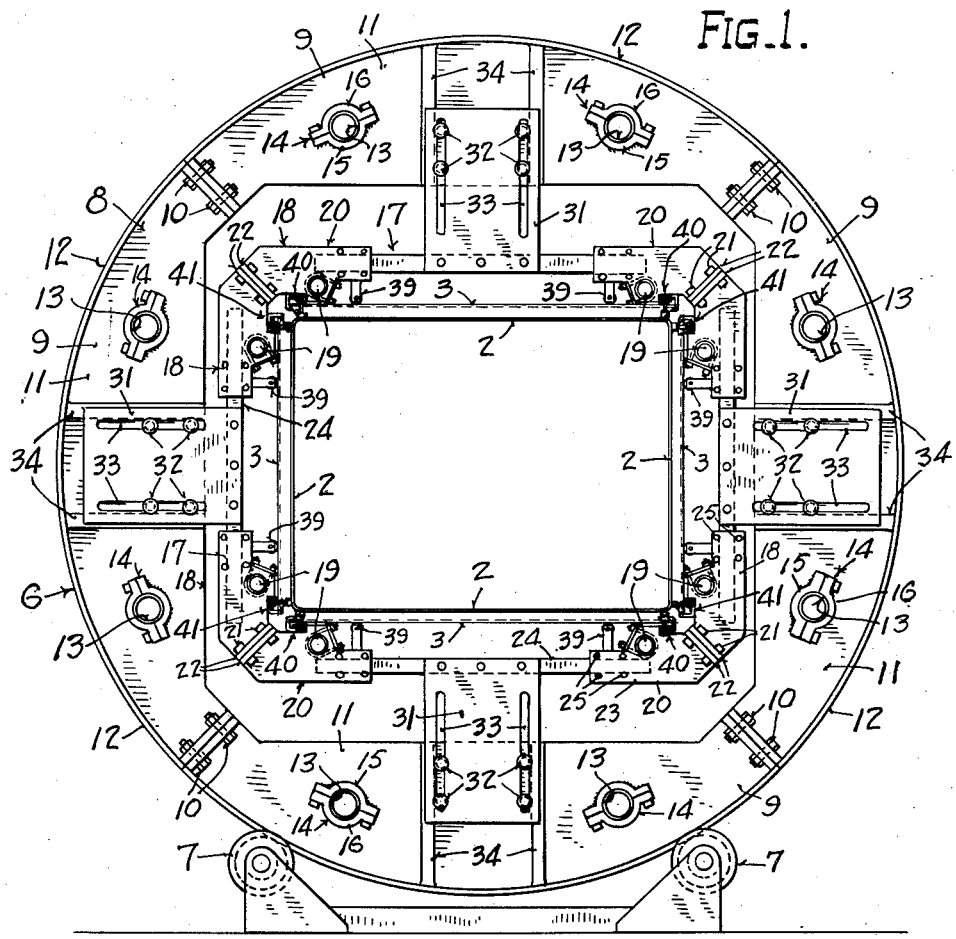

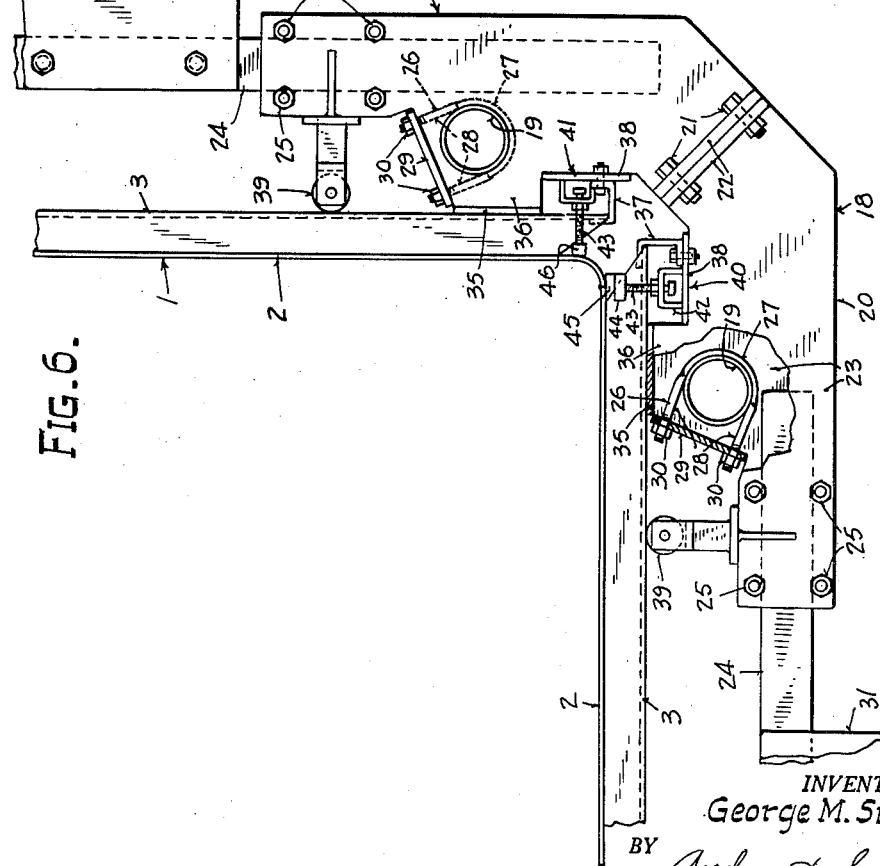

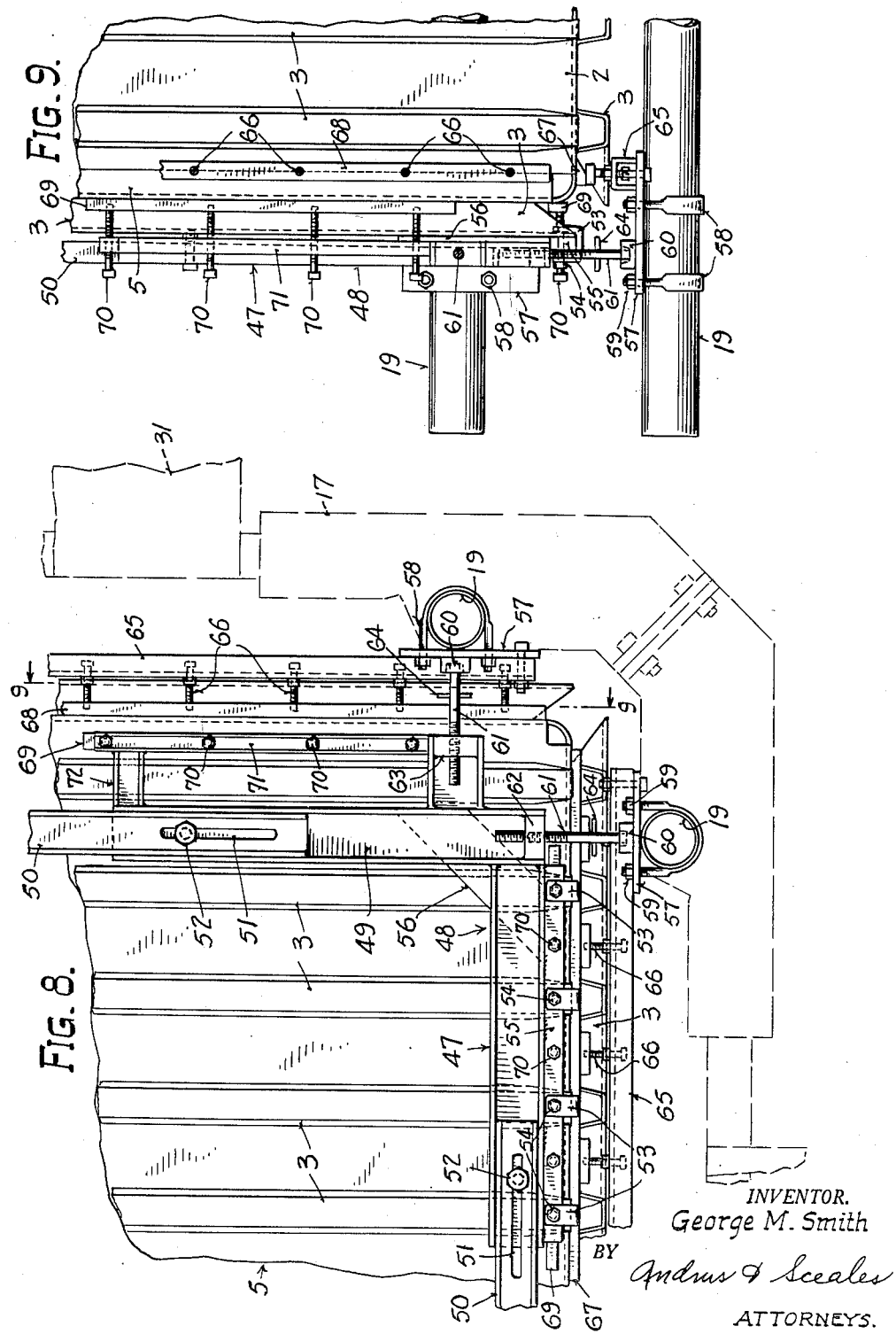

United States Patent Office 2,768,597
Patented Oct. 30, 1956

2,768,597

WELDING FIXTURE FOR THIN WALLED TANKS

George M. Smith, Grafton, Wis., assignor to A. O. Smith Corporation, Milwaukee, Wis., a corporation of New York Application December 20, 1950, Serial No. 201,763

3 Claims. (Cl. 113—99)

This invention relates to welding fixtures, and particularly to a fixture for welding the seams of large thin walled tanks.

An object of the invention is to provide a fixture which may be utilized in welding vessels of various lengths and diameters and which completely eliminates the necessity for tack welding as a step in vessel fabrication.

Another object is to provide a fixture which is readily rotatable about its longitudinal axis, so that the seams of the tank may all be made by downhand arc welding.

A further object of the invention is to provide a means for fitting the various edges of the tank sections into precise abutting alignment prior to the welding thereof.

Another object is to provide a welding fixture which may be disassembled into four portions, corresponding to the four side walls of the tank, in order to facilitate clamping of the side walls to the fixture portions and assembly of the side walls into welding position.

The welding fixture, in general, comprises a rectangular clamping frame mounted within a circular cage structure which is supported on rolls to permit rotation of the fixture for downhand welding of the seams between the tank wall sections clamped therein. In order to adapt the fixture for the welding of different lengths of tanks, the cage and frame are formed of corresponding sections which may be adjustably secured in various axially aligned positions along connecting members disposed longitudinally of the tank. Adjustment of the fixture for various diameters of tanks, on the other hand, is made possible through the use of expansible frame sections connected by radially slidable mountings to the cage sections corresponding therewith.

Other objects and advantages will be set forth more fully in the following description of the embodiment of the invention illustrated in the accompanying drawings.

In the drawings:

Figure 1 is an end view illustrating the fixture as employed in welding the side walls of a rectangular ribbed tank;

Fig. 2 is a view corresponding generally to Fig. 1 but showing the fixture after a head frame has been mounted thereon;

Fig. 3 is a longitudinal central vertical section of the fixture;

Fig. 4 is an exploded schematic view of a tank which may be welded through use of the fixture;

Fig. 5 is a fragmentary view of a braced corner of the tank illustrated in Fig. 4;

Fig. 6 is a detail end view of a corner of one of the clamping frame sections;

Fig. 7 is a detail side view of one of the clamping frame sections;

Fig. 8 is a detail end view, corresponding to Fig. 2, of the fixture with a head frame thereon; and Fig. 9 is a section taken along line 9—9 of Fig. 8.

Referring to Figs. 4 and 5 of the drawings, the structure and operation of the fixture may be illustrated by describing its use in the welding of a large rectangular storage vessel 1 having four relatively thin side walls 2 reinforced by a plurality of axially spaced ribs 3. The ribs 3, which are die formed from thin metal, are spot welded to the external surfaces of the walls 2 prior to the assembly thereof and are joined by corner braces 4 after the welding of the longitudinal seams between adjoining side walls 2 has been completed. As the final step in the construction of the tank 1, head sections 5 are welded to the side walls 2 and the ribs which reinforce the heads are connected by suitable corner braces to the encircling ribs 3 nearest the ends of the vessel.

In order to facilitate downhand arc welding of the longitudinal seams between the side walls 2 as well as the transverse seams which join the heads 5 to the side walls, the fixture is constructed with a cage 6 supported on suitable turning rolls 7 for rotation about its longitudinal axis. The cage 6 comprises a plurality of axially and radially aligned sections 8 each of which is made up of four beams 9 detachably secured to each other by means of bolts 10 at the flanged ends thereof. The various beams 9 are shaped, as shown in Figs. 1 and 3, with relatively thin inner webs 11 and with outer flanges or tracks 12 which rest on the rollers 7 and are curved so that the periphery of each assembled cage section 8 is annular in shape.

In the mass production of thin walled vessels such as the stainless steel storage tanks utilized in the brewing industry it is highly important, because of the large size and cost of the welding fixtures employed and because of the greatly varying requirements of different customers, that the fixtures be adjustable for the welding of a variety of lengths and diameters of tanks. To provide for the former type of ajustment, the rotatable cage 6 is constructed with a plurality of connecting pipes 13 which extend for the full length of the fixture so that the cage sections 8 may be slid therealong and locked in any desired positions.

With the described cage construction, when a long tank is to be welded five or more cage sections 8 may be arranged at relatively large intervals along the connecting pipes, whereas a smaller number of sections 8 may be relatively closely spaced along the same or shorter pipes 13 when the fixture is used for welding a short tank. Referring to Figs. 1 and 3, two pipes 13 are shown for each row of cage section beams 9, with the beams being locked to the pipes by means of suitable split collars 14. Each split collar 14 preferably comprises a stationary half 15 welded to one side of a web 11 and a movable half 16 bolted to the stationary half to lock the corresponding cage section at the proper position for the particular length of tank to be welded.

During the various welding operations, the side walls 2 of the tank 1 are held within a clamping frame 17 which in turn is adjustably mounted within the cage 6 as will be described subsequently. The clamping frame 17 is formed of a number of axially spaced rectangular sections 18 locked along longitudinal connecting pipes 19 similarly to the case of the cage 6. Depending upon the length of tank, there may be a frame section 18 corresponding to each cage section 8, or certain of the cage sections 8 and associated turning rolls 7 may be eliminated as in Fig. 3.

Each frame section 18 comprises four extensible members 20 which are parallel to the corresponding cage beams 9 and are detachably connected at their ends as by suitable bolts 21 in end members 22.

Referring to Figs. 6 and 7, the ends of each member 20 are preferably constructed of pairs of plates 23 held in parallel relation with each other by means of the end members 22 welded thereto. The center of each extensible member 20 is a square beam 24 which fits between the end plates 23 and is frictionally secured thereto by rows of bolts 25 extending between the opposed end plates adjacent the sides of the box beams.

In order to adjustably lock the respective frame sections 18 to the connecting pipes 19, U-shaped clamping members 26 are provided between the pairs of end plates 23 through which the pipes extend. The members 26 comprise semi-circular pipe sections 27 which fit over the pipes 19 and have inwardly extending threaded rods 28 welded to the corners thereof. The rods 28 extend through pads 29 bridged between inner edge portions of the end plates 23, so that the tightening of nuts 30 on the ends of the rods effects firm connection between the frame sections and pipes connecting the same.

When it is desired to adjust the fixture for welding a different length of tank, the nuts 30 are loosened and the movable halves 16 of the split collars 14 are unbolted from the stationary halves 15 thereof. The cage sections 8 and associated frame sections 18 are then free to slide relatively to the pipes 13 and 19, permitting the spacing of the cage and frame sections to be altered and sections to be added or removed as previously described.

In order to provide for the welding of square and rectangular tanks having various diameters, the ends of the square beams 24 are disposed outwardly of the pipes 19 and may be slid past the same, after the bolts 25 have been loosened, to substantially extend the members 20. The resulting expansion or contraction of the frame sections 18 with respect to the cage sections 8 in which they are mounted is made possible through the use of pairs of mounting plates 31 which are bolted at their inner ends to the respective square beams 24 and slidably mounted at their outer ends on opposite sides of the cage beam webs 11.

Each slidable mounting, as illustrated in Figs. 1 and 3, comprises bolts 32 which extend through the web 11 and through longitudinal slots 33 in the opposed mounting plates 31. The plates 31 preferably rest upon raised rib portions 34 of the webs 11 which serve the double purpose of strengthening the webs and of holding the mounting plates parallel to each other.

In adjusting the fixture for a different diameter of tank, the bolts 32 of the lower mounting plates 31 (Fig. 1) and the lower sets of bolts 25 of the adjacent vertical extensible members 20 are first loosened. The lowermost horizontal member 20 is thus freed and may be moved to the desired position, after which the bolts are tightened and the fixture rotated for repetition of the process until the desired setting is achieved.

In addition to the modes of adjustment previously described, the frame and cage sections may be adjusted both axially and radially while the fixture is disassembled into four portions corresponding to the four side walls of the tank. Disassembly is effected by removing the corner bolts 10 and 21 and may be availed of to facilitate clamping of the side walls 2 to the clamping frame members 20 prior to welding and removal of the completed tank subsequent thereto.

During the construction of the tank 1 illustrated in the drawings, the clamping of each side wall 2 is accomplished by resting the ribs 3 thereof on support plates 35 (Figs. 6 and 7) which are welded, respectively, between raised inner edge portions 36 of the pairs of end plates 23. Hooks 37 are then inserted into the ends of those of ribs 3 which correspond to the frame sections 18, and the hooks are bolted to mounting plates 38 welded to the respective end plates 23 adjacent the raised edge portions 36 thereof.

After the side walls 2 have been securely clamped as described, the fixture is assembled through the use of a crane and the corner bolts 10 and 21 are inserted in place. Alternatively, the side walls 2 may be clamped in position without disassembling the fixture, with the adjustment of the expansible clamping frame 17 being utilized to achieve any clearance which may be necessary.

As shown in Figs. 6 and 7, rollers 39 are mounted on the frame members 20 to aid in the movement and positioning of the side walls 2. The rollers may be arranged for rotation about either longitudinal or transverse axes, depending upon the mode of assembly and clamping which it is desired to employ.

Referring to Fig. 4, the edges of two of the tank side walls clamped opposite each other in the fixture are illustrated as being bent or curved to abut the edges of the adjacent side walls. It is essential to proper welding that these edges meet exactly along the full length thereof, without any gap or distortion.

According to the invention, the desired fit-up between the edges to be welded is accomplished by means of four chill bar jack systems 40 (Figs. 6 and 7) and four similar push bar systems 41, all of which are preferably mounted in the fixture while the same is disassembled into its four portions and before the tank side walls 2 have been clamped in place. Each chill bar jack system comprises a channel beam 42 having a plurality of spaced jack bolts 43 threaded through the web thereof and pivotally connected to a corresponding number of short mounting bars 44 for a copper chill bar 45.

Two chill bar systems 40 are mounted on each of the two fixture portions adapted to support the side walls having straight or unbent edges. When in position, the chill bars 45 fit against the full length of the straight edges and laterally overhang the same, with the inner edges of the respective chill bars being beveled to fit between the side wall edges and the associated ribs 3 which are illustrated as having their ends cut at an acute angle relative to the side wall edges corresponding thereto. In mounting the chill bar systems, the channel beams 42 thereof are bolted to the mounting plates 38 to which the hooks 37 are subsequently secured, the spacing being such that the jack bolts 43 extend between the ribs 3 to the chill bar mountings 44.

The push bar systems 41 are identical with the chill bar systems 40 except that a single push bar 46 is pivotally connected to the ends of jack bolts 43 in place of the chill bar mountings 44. Similarly to the case of the chill bar systems, two push bar systems are mounted on the plates 38 of each of the two fixture portions adapted to support the bent-edged side walls 2. Each push bar 46 engages the body of the corresponding side walls adjacent the curve or bend between the body and the edge.

When the four portions of the fixture are assembled and the bolts 10 and 21 secured in place, the side walls 2 will be rectangularly arranged in approximate welding position, with the pairs of bent and unbent edges being in general opposition adjacent the corresponding chill bars 45. The fixture is then rotated until the bent-edged side walls are in vertical position, and the jack bolts 43 for the lower two chill bar systems 40 are turned to urge the associated chill bars 45 against the opposed edges and bring the same into correct welding alignment.

After a set of edges has been aligned as described, the associated push bar jack systems 41 are employed to bring the opposed edges into engagement. This is accomplished by turning the various jack bolts 43 until the corresponding curved edges have been moved into engagement as desired. Due to the fact that the side walls 2 are securely clamped in position by the hooks 37, any bending which occurs during the above described operations is localized in the edges outwardly of the ends of ribs 3.

The aligned and abutting edges at the two lower corners are then arc welded, for example by an automatic welder running along a track, not shown, which may be rested on the lower horizontal side wall 2. Subsequently, the fixture is rotated 180 degrees and the remaining longitudinal seams are aligned and welded in the manner described.

In carrying out the assembly and welding of the vessel 1, the ribbed head sections 5 of the tank are clamped to head frames 47 (Figs. 2, 8 and 9) for welding to the ends of the side walls 2. Each head frame comprises corner members 48, made up of channel sections 49 welded at right channel to each other, and angle bars 50 which connect the corners. Adjustment of the frames for different tank diameters is made possible by longitudinal slots 51 in the channel members 49 adapted to receive bolts 52 which frictionally connect the channel bars 50 with the channel members.

Referring to Fig. 9, each head may be clamped to its frame by means of hooks 53 spaced to fit in the ends of the ribs 3 of the head. The hooks 53 are secured by bolts 54 to suitable bars 55 welded to the edges of the four channel members 49 which are transverse to the ribs, that is to say the upper and lower horizontal channel members in Fig. 2. At the extreme corners of the frames, corner braces 56 may be welded to the inner surfaces of the channel bars.

The means for supporting the head frames at the ends of the side walls 2 preferably comprise plates 57 mounted on the pipes 19 outwardly of the end clamping frame sections 18. Axial adjustment of the mounting plates 57 for different tank lengths is facilitated by the use of U-bolts 58 having threaded ends which extend through the plates 57 to be demountably clamped in place by nuts 59.

The mounting plates 57 have sockets 60 affixed to the inner surfaces thereof to receive the outer rounded ends of jack bolts 61 which are threaded into suitable mountings 62 and 63 at the corners of the head frame. The mountings 62 are located in the ends of the vertical channels 49, Figs. 2 and 8, whereas the mountings 63 take the form of brackets welded to the outer flanges of the vertical channels so that the jack bolts 61 therein extend perpendicularly to said channels and to the jack bolts in the mountings 62.

In operation, each head frame 47 and head section 5 clamped therein is lifted by a crane and suspended in the proper position adjacent the ends of the previously welded side walls. The various jack bolts 61 are then turned, by means of handles 64 welded transversely thereof, to cause the ends of the bolts to fit in the sockets 60. The head 5 is then in the correct position, due to proper location of the sockets, and the weight of the head and head frame is carried by the jacks instead of the crane.

As shown in Fig. 4, the four edges of each head are all curved inwardly to meet the end edges of the side walls 2. The downhand butt welding of the seams between these edges is performed with chill bar systems 65 which are substantially the same as the systems 40 employed in welding the longitudinal seams of the vessel. Referring to Figs. 8 and 9, the systems 65 are bolted to the respective mounting plates 57 and extend adjacent the seams so that the jack bolts 66 therefor project inwardly to the chill strips 67 and 68.

The push bar systems for the transverse seams, however, differ from the systems 41 employed in welding the longitudinal seams between the various side walls 2. For the upper and lower horizontal push bars 69 (Figs. 2 and 8) adjacent the ends of the head ribs 3, the jack bolts 70 may be threaded through the bars 55 to which the hooks 53 are secured.

The vertical push bars 69, on the other hand, are operated by jack bolts which extend through channel beams 71. The beams 71 are welded between the respective mounting brackets 63 and similar brackets 72 at the opposite ends of the vertical channels 49.

After the lower transverse edges have been aligned and positioned by the lower chill and push bar systems, the seam therebetween is welded, as in the case of the longitudinal seams, and the fixture is rotated 90 degrees for repetition of the process.

The welding apparatus is then taken from the inside of the tank through manways in the heads 3 thereof. To remove the tank from the fixture, the various hooks 37 and 53 are unbolted and the ribs 3 thereby released, after which the chill bar and push bar systems are demounted. A sufficient number of corner braces 4 are then welded in position, as shown in Fig. 5, to prevent the tank from collapsing after its removal from the fixture.

Thereafter, the bolts 10 and 21 are removed and the fixture disassembled into its four portions to permit the tank to be lifted out by a crane. The described adjustment of the frame sections 18 may also be utilized for tank removal, with or without disassembly of the upper portion of the fixture.

The remaining corner braces 4, as well as other parts of the tank 1, are welded in place after the tank is removed from the fixture.

When the fixture is adjusted for welding tanks of different lengths or diameters, the chill and push bar systems 40, 41 and 65 may either be replaced by systems of correspondingly different lengths or the same systems may be bolted in different positions.

The described fixture may be employed in the welding of a large number of types of either open or closed top tanks without the necessity for tack welding and with a substantial increase in production speed and weld quality.

Various embodiments of the invention may be employed within the scope of the accompanying claims.

I claim:

1. In a welding fixture adapted to position the relatively thin side walls of a large rectangular tank in approximate position for the welding of the longitudinal edges thereof, one of said longitudinal edges being bent at a right angle to the body of the side wall with which it is integral to make possible a butt joint between said bent edge and the unbent edge generally adjacent thereto, a chill bar adapted to engage the joint between the opposed bent and unbent edges along the full length thereof, jack means mounted on said fixture outwardly of the side walls and connected to said chill bar to urge the same against the joint between said bent and unbent edges and bring said edges into correct welding alignment, a push bar disposed outwardly of the side walls parallel to the chill bar and adapted to bear against said side wall body integral with the bent edge and at a position adjacent to said bent edge, and second jack means mounted on said fixture and acting in a direction normal to the direction of action of said first named jack means, said second jack means being connected to said push bar to force said bent edge against said unbent edge and permit the formation of a butt joint against the backing of said chill bar.

2. A fixture for welding a generally rectangular tank formed of a plurality of generally rectangular panels corresponding to the walls of the tank, said panels having a main body portion and a bent edge portion, which comprises a plurality of annular cage sections connected in axial alignment and mounted on turning rolls for rotation about their longitudinal axis, each of said cage sections formed of four generally arcuate segments corresponding to the four side walls of said tank, said segments being detachably secured together in a circular arrangement to form said annular cage sections, connecting means for connecting the panels to the related segments to cause the panels to be arranged in rectangular form when said segments are assembled into said cage sections, and adjustable means separate from said connecting means and connected to said segments for engaging the outer surface of a panel and forcing the bent edge of said panel into abutting engagement with respect to the opposed straight edge of an adjacent panel in preparation for welding said edges together.

3. A fixture for welding a tank of generally rectangular cross-section formed of a plurality of generally rectangular panels corresponding to the walls of the tank with said panels having a main body portion and a bent edge portion normal to the body portion, said fixture comprising a plurality of annular cage sections connected in axial alignment, each of said sections being formed of four arcuate segments secured together in circular arrangement and corresponding generally to the wall panels of the tank, a beam disposed inwardly of each segment and slidably attached thereto to permit relative movement of the beam with respect to the segment, clamping means provided on each beam and adapted to secure a tank wall panel thereto, said beams being movable with respect to the corresponding segments to arrange the respective tank wall panels into generally rectangular relation with the bent edge of each panel generally abutting the edge of the adjacent panel, means to lock the respective beams to the corresponding segments, a chill bar extending between the cage sections and adapted to engage the joint between adjacent panels, jack means provided on each beam and adapted to urge the chill bar against the joint to align the engaging edges, a push bar extending between the cage sections and being adapted to engage the body portion of the panel adjacent to the bent edges, and second jack means provided on each beam and acting in a direction normal to the direction of action of the first named jack means and aadpted to urge the push bar against the panel to force the abutting edges together, said chill bars and push bars serving to bring the edges of adjacent panels into correct welding alignment with the chill bar backing up the joint for welding.

References Cited in the file of this patent

UNITED STATES PATENTS

| | | |
|---|---|---|
| 459,637 | Lee | Sept. 15, 1891 |
| 1,301,793 | Spery | Apr. 22, 1919 |
| 1,464,207 | Ledwinka | Aug. 7, 1923 |
| 1,546,250 | Phillips | July 14, 1925 |
| 1,549,251 | Geyer | Aug. 11, 1925 |
| 1,550,161 | Hamm | Aug. 18, 1925 |
| 1,573,360 | Shoenberger | Feb. 16, 1926 |
| 1,642,549 | Jarecki | Sept. 13, 1927 |
| 2,020,830 | Gray | Nov. 12, 1935 |
| 2,117,435 | Langstroth | May 17, 1938 |
| 2,187,878 | Hill et al. | Jan. 13, 1940 |
| 2,204,266 | Wilcox | June 11, 1940 |
| 2,256,879 | Cornell | Sept. 23, 1941 |
| 2,277,631 | Bullock | Mar. 24, 1942 |
| 2,299,753 | Johnson et al. | Oct. 27, 1942 |
| 2,320,079 | Hartwig | May 25, 1943 |
| 2,354,794 | Buehler | Aug. 1, 1944 |
| 2,421,973 | Trimble | June 10, 1947 |
| 2,671,957 | Sheffer et al. | Mar. 16, 1954 |

FOREIGN PATENTS

| | | |
|---|---|---|
| 539,716 | France | June 30, 1922 |